(12) United States Patent
Lee et al.

(10) Patent No.: US 10,293,711 B2
(45) Date of Patent: May 21, 2019

(54) DEVICE AND METHOD FOR CONTROLLING VEHICLE SEAT

(71) Applicant: HYUNDAI DYMOS INCORPORATED, Seosan-si, Chungcheongnam-do (KR)

(72) Inventors: Ho Cheoul Lee, Osan-si (KR); Chang Won Lee, Osan-si (KR)

(73) Assignee: HYUNDAI DYMOS INCORPORATED, Chungcheongnam-Do (KR)

( * ) Notice: Subject to any disclaimer, the term of this patent is extended or adjusted under 35 U.S.C. 154(b) by 13 days.

(21) Appl. No.: 15/526,316

(22) PCT Filed: Dec. 22, 2015

(86) PCT No.: PCT/KR2015/014124
§ 371 (c)(1),
(2) Date: May 11, 2017

(87) PCT Pub. No.: WO2016/108498
PCT Pub. Date: Jul. 7, 2016

(65) Prior Publication Data
US 2017/0327007 A1   Nov. 16, 2017

(30) Foreign Application Priority Data
Dec. 31, 2014 (KR) ......................... 10-2014-0195104

(51) Int. Cl.
*B60N 2/02* (2006.01)
*B60N 2/06* (2006.01)
(Continued)

(52) U.S. Cl.
CPC ............. *B60N 2/0248* (2013.01); *B60N 2/06* (2013.01); *B60N 2/062* (2013.01); *B60N 2/067* (2013.01);
(Continued)

(58) Field of Classification Search
CPC .................................................... B60N 2/0248
(Continued)

(56) References Cited

U.S. PATENT DOCUMENTS

| | | | |
|---|---|---|---|
| 6,949,904 B2 * | 9/2005 | Rumney | B60N 2/002 318/286 |
| 7,479,749 B2 * | 1/2009 | Gerding | B60N 2/0276 318/286 |
| 8,193,746 B2 * | 6/2012 | Jimenez Pino | B60N 2/0244 318/268 |

FOREIGN PATENT DOCUMENTS

| | | |
|---|---|---|
| JP | 2002234368 A | 8/2002 |
| JP | 2004123044 A | 4/2004 |

(Continued)

OTHER PUBLICATIONS

International Search Report dated Mar. 30, 2016 International Application No. PCT/KR2015/014124.

*Primary Examiner* — David Luo
(74) *Attorney, Agent, or Firm* — Womble Bond Dickinson (US) LLP (57) ABSTRACT

The present invention relates to a vehicle seat control apparatus and a control method thereof. The present invention is based on a structure in which a hall sensor is applied to a seat motor for providing an operation power of a power seat, and a seat caught situation is judged through a sensing operation of the hall sensor and a maximum current is supplied to the seat motor in the present invention. Therefore, the present invention has an advantage of solving the seat caught situation by improving the operation mode of the seat control apparatus to which the soft start mode is applied.

10 Claims, 5 Drawing Sheets

(51) Int. Cl.
  *B60N 2/07* (2006.01)
  *B60N 2/12* (2006.01)
  *B60N 2/22* (2006.01)

(52) U.S. Cl.
  CPC ................ *B60N 2/07* (2013.01); *B60N 2/12* (2013.01); *B60N 2/22* (2013.01); *B60N 2002/0264* (2013.01); *B60N 2002/0272* (2013.01)

(58) Field of Classification Search
  USPC .................................................. 318/565, 34
  See application file for complete search history.

(56) References Cited

FOREIGN PATENT DOCUMENTS

| | | | |
|---|---|---|---|
| JP | 2006347514 A | 12/2006 |
| JP | 2008126903 A | 6/2008 |
| KR | 1020130039104 A | 4/2013 |

\* cited by examiner

DEVICE AND METHOD FOR CONTROLLING VEHICLE SEAT

TECHNICAL FIELD

The present invention relates to a vehicle seat, and more particularly, to a vehicle seat control apparatus and a control method thereof, which improve a problem of seat caught by changing the initial torque value of a motor to a maximum when a seat is caught in a power seat to which sequential startup control logic is applied.

BACKGROUND

The vehicle seat is intended to maintain the boarding posture of the vehicle occupant and is comprised including a seat cushion and a seat back on a seat frame having a seat rail downward. At this, at the rear of the seat rails and the seat frame, a sliding device and a reclining device are provided to maintain a posture suitable for driving and to maintain posture suitable for the body shape of the occupant.

In such a device, the occupant operates the lever by hand to operate the sliding device and reclining device connected thereto to move the seat in the forward and backward directions, or the occupant can adjust the angle of the seat back in the forward and backward directions.

However, in recent years, a power seat capable of operating the operation of these devices electrically by using a switch has been used in respect of the benefit of the occupant. The power seat is also called a memory seat.

Figure 1:
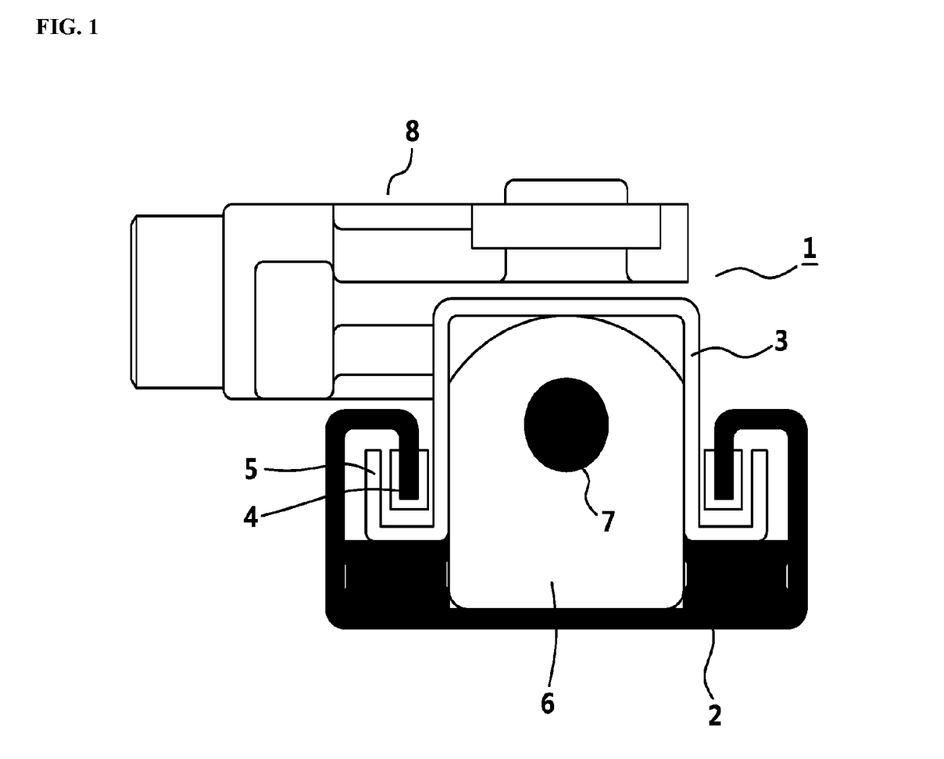
FIG. 1 is a seat rail construction diagram of general power seat.

A structure in which the seat rail of the power seat as described above is applied will be described with reference to FIG. 1.

A seat rail (1) of a vehicle comprises a first rail (2) having a bracket on a bottom surface so as to be fixed to a bottom surface of a vehicle and a second rail (3) combining to a first rail (2) and fixing a seat on an upper surface using a bracket.

The upper and lower ends of the first rail (2) and the second rail (3) have flanges 4, 5 bent outward and inward, respectively.

A screw block (6) is fixed to the side of the first rail (2) and a deceleration means (8) linked to the motor and projecting the ball screw (7) backward is connected to the fore part of the screw block (6). A bracket for holding an end portion of the ball screw (7) is fixed to the rear of the second rail (3) so that a motor operated by the switch rotates the ball screw (7) of the deceleration means (8) and thus the second rail (3) is able to slide in the forward and backward directions of the first rail (2).

The power seat is moved by the motor, and sequential startup control logic is conventionally applied. This is to reduce the impact and rebound when the motor of the power seat is operated.

However, in this case, a seat caught situation in which a seat portion is caught in a twist of the seat mechanism portion or a damping means provided at an end portion may occur. In the case of the sequential startup control logic, the motor speed is slowly rotated during the initial operation. If the seat caught situation occurs, the seat may not be slid and moved due to insufficient current applied at the initial stage.

Such a problem is caused by operating the power seat in a soft start mode, thereby failing to achieve improvement in the marketability and quality of the power seat.

SUMMARY OF INVENTION

The present invention is directed to providing a vehicle seat control apparatus and a control method thereof which provides a maximum value of an initial torque value when a power seat caught situation occurs thereby solving a seat caught situation.

Solution to Problem

According to an aspect of the present invention for achieving the above object, the present invention provides a vehicle seat control apparatus comprising an operation switch to move a seat; a seat motor for providing operation power for seat movement; wherein, during the operation of the operation switch, when the seat does not move despite the power supply to the seat motor, the seat motor is controlled as non-operation mode, and when the operation switch operates again, the seat motor is controlled as a maximum operation power.

The control unit controls the seat to be driven in the soft start mode and makes the sliding movement of the seat, which is the basic operation mode, when the operation switch is operated again after the operation of the seat is operated at the maximum operation power According to another aspect of the present invention, the present invention provides a seat motor providing operation power for seat movement; a sensor sensing whether the seat moves or not; a control unit controlling the operation of the seat motor by selecting one operation mode according to the sensing signal out of the sensor; wherein the operation mode comprises the first operation mode of the soft start method and the second operation mode driving the seat motor at the maximum current amount.

When the sensing signal is not output, the control unit controls the seat motor in the first operation mode.

When the sensing signal is output, the control unit controls the seat motor in the second operation mode.

The sensor is a hall sensor, and at least one hall sensor is mounted on a part of the rail on which the seat moves.

According to another aspect of the present invention, the present invention provides a method for controlling seat for vehicle comprising operating the operation switch for seat movement; determining of a control unit on whether the sensing signal is output from the hall sensor connected with the seat motor when the operation of the operation switch is sensed; and controlling of the control unit of the seat motor to different operation modes according to the sensing signals.

When the sensing signal is not output, the control unit controls the seat motor by supplying a current available for the seat motor side among the vehicle battery power.

Meanwhile, the present invention, at the stage of controlling the operation switch, the seat motor is not operated when the seat does not move, and the seat motor is controlled at the maximum operation power when the operation switch is controlled again.

And when the operation switch is controlled again after the seat movement happens by controlling the seat motor at the maximum operation power, the seat motor is controlled at the soft start mode and makes the seat move.

Effects of Invention

According to a vehicle seat control apparatus and a control method thereof of the present invention constructed as described above, the following effect are obtained.

The present invention uses a sensing signal of a hall sensor applied to a vehicle seat to judge a seat caught incidence situation of a power seat. When the sensing signal is not output, it is determined that the seat caught situation has occurred, and when the sensing signal is output, it is determined that the seat caught situation does not occur.

When the seat caught situation occurs according to the determination result, the seat motor is operated at the maximum amount of current that can be supplied. Therefore, even if a seat caught situation occurs, it is possible to solve the problem that occurs in the conventional unconditional soft start mode, that is, the problem that the seat does not move.

Of course, if the seat caught situation does not occur, the seat is moved in the soft start mode as in the conventional method, so that the reversal sound and the reverse impact can be reduced.

As described above, according to the present invention, one of the two modes can be selectively applied according to whether the error of the Hall sensor occurs or not, thereby enhancing the product competitiveness.

In addition, since the hall sensor provided in the existing power seat can be used as it is, it is not necessary to add a configuration, so that the present invention can be applied without increasing the cost.

METHOD FOR CARRYING OUT THE INVENTION

The present invention is based on a structure in which a hall sensor is applied to a motor that provides an operation power for a power seat, and the power seat can be sufficiently moved in sliding mode even if a seat caught phenomenon occurs by determining whether or not a seat is caught through a sensing operation of a hall sensor and by maximizing an initial operation power of the seat motor when a seat caught situation occurs.

Hereinafter, an exemplary embodiment of a vehicle seat control apparatus and a control method thereof according to the present invention will be described in detail with reference to the accompanying drawings.

Figure 2:
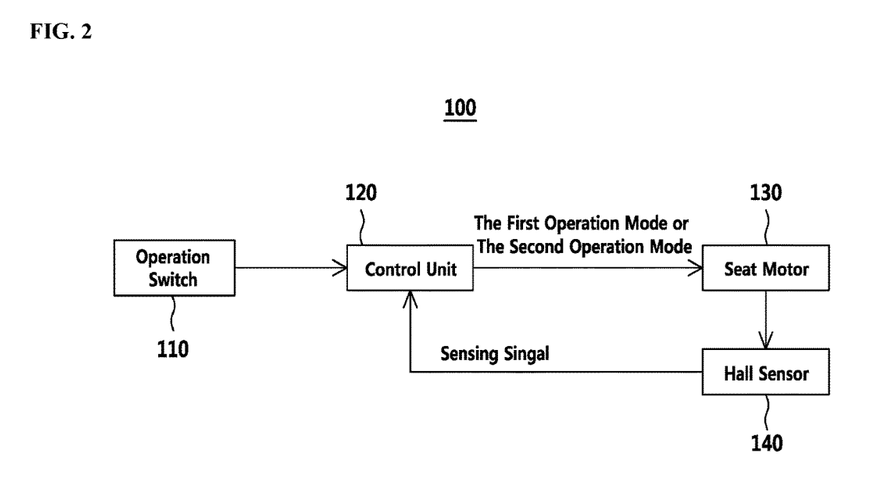
FIG. 2 is a block diagram illustrating a seat controlling apparatus according to an exemplary embodiment of the present invention.

FIG. 2 is a block diagram illustrating a seat controlling apparatus according to an exemplary embodiment of the present invention.

According to FIG. 2, the vehicle seat control apparatus 100 is provided with an operation switch 110 for sliding movement of the seat. The operation switch 110 is configured to protrude from the slide structure of the seat, and is a switch for adjusting the slide and the reclining seat. As a result, the occupant can obtain the optimum seat position with a simple operation. Through this, the occupant can obtain the optimum seat position only by a simple operation.

A seat motor 130 that outputs an operation power to slide the seat in accordance with the operation of the operation switch 110 is constructed.

A hall sensor 140 is constructed on the side of the seat motor 130. The hall sensor 140 does not unconditionally output sensing signals even if the seat motor 130 is operated. That is, when the seat caught situation occurs, the seat motor 130 is continuously operated, so that the motor output signal is generated but the hall sensor 140 does not output the sensing signal. When the hall sensor 140 is used as described above, it is not necessary to consider the temperature or the current size according to the applied voltage. Also, there is no need to additionally provide a hall sensor because the hall sensor 140 which has been previously provided is used. Therefore, the problem of cost increase does not occur. At this time, the hall sensor 140 can be separately composed from the seat motor 130.

A control unit 120 for controlling the operation of the seat motor 130 in accordance with the operation of the operation switch 110 is configured. The control unit 120 controls the functions for calculating the current position of the seat, storing the target position, and moving to the target position, however, in this embodiment, it takes the role of performing the first operation mode or the second operation mode according to the output of the hall sensor 140. The first operation mode is a soft start mode which is a sequential startup control logic, and the second mode is a 100% duty mode. That is, the first operation mode is to slide the seat by using the general soft start mode applied to the power seat, and the second operation mode is to slide the seat by maximizing the initial operation power according to the seat caught situation. This is because when the seat caught situation occurs, the seat does not move when operated in the first operation mode.

Figure 3:
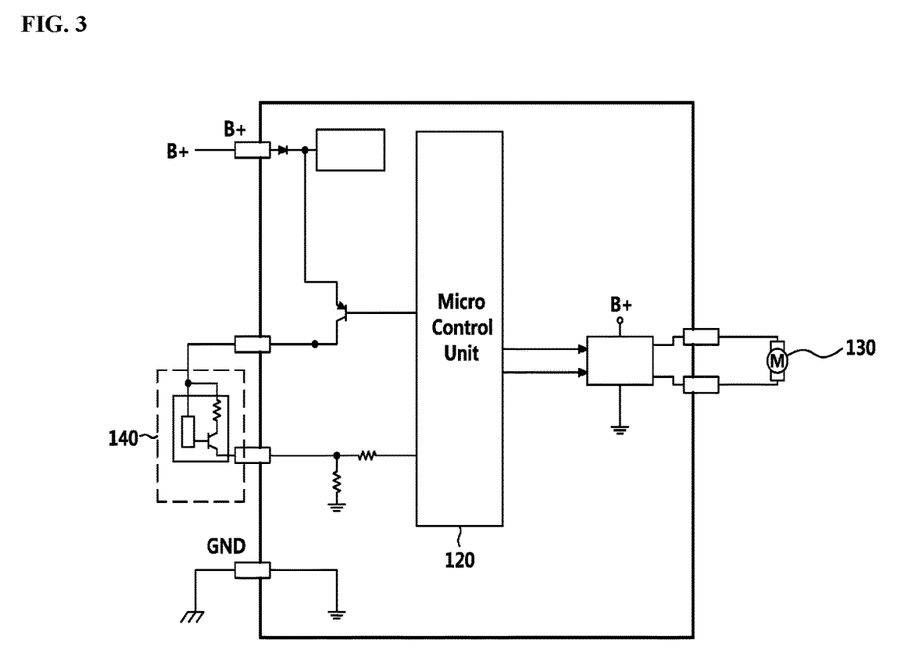
FIG. 3 is a circuit system diagram illustrating FIG. 2.

FIG. 3 is a circuit system diagram illustrating FIG. 2

According to FIG. 3, a micro control unit (MCU) 120, a seat motor 130, and a hall sensor 140 are configured. In the present exemplary embodiment, the detailed description of the circuit configuration will be omitted.

Next, the operation of the vehicle seat control apparatus configured as described above will be described with reference to FIG. 4 and FIG. 5.

Figure 4:
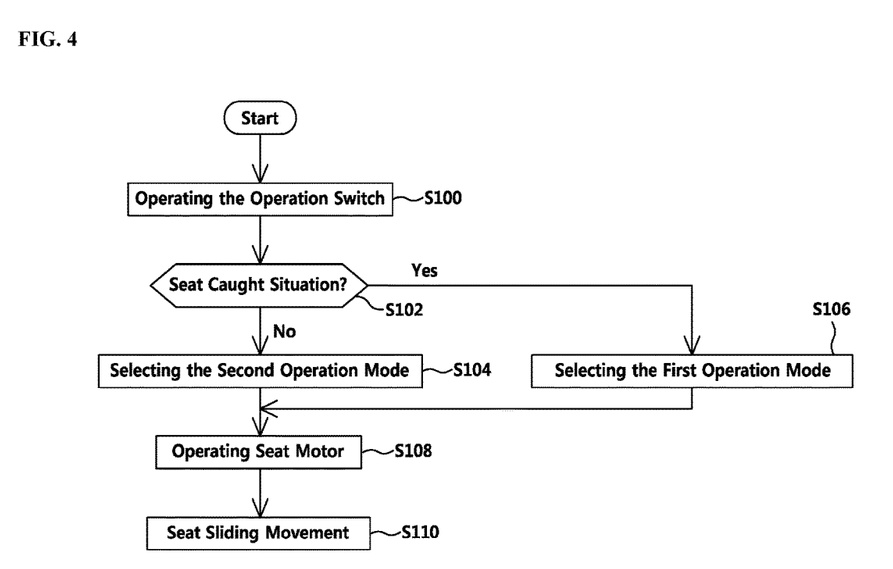
FIG. 4 is a flow chart illustrating a method for controlling seat for vehicle according to an exemplary embodiment of the present invention.
Figure 5:
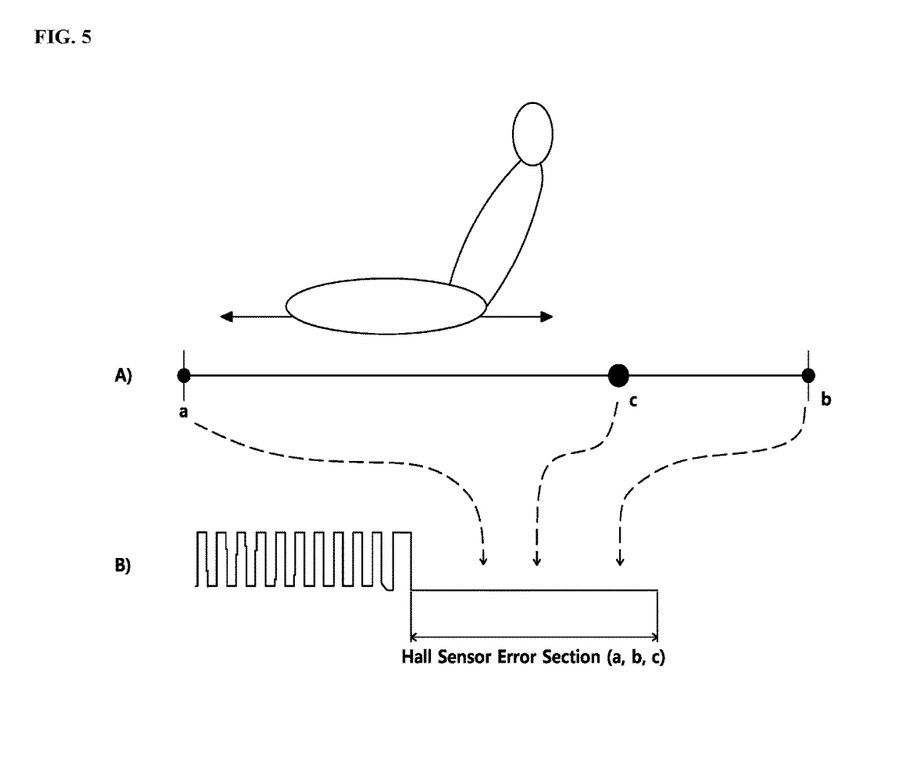
FIG. 5 is a drawing illustrating a state of the error of a hall sensor.

FIG. 4 is a flow chart illustrating a method for controlling seat for vehicle according to an exemplary embodiment of the present invention, and FIG. 5 is a drawing illustrating a state of the error of a hall sensor.

The driver (occupant) operates the operation switch 110 to move the seat position (s100). Then, the control unit 120 moves the seat in the forward and backward directions in accordance with the operating direction of the operation switch 110. In this case, the seat is moved while the operation switch 110 is operated, or in the case of a power seat of memory type, the seat is moved to the set position based on the memorized information. However, the seat may not move when the seat caught situation occurs.

The seat caught situation is determined based on whether the control unit 120 outputs the sensing signal of the hall sensor 140 (s 102). Namely, when the operation switch 110 is operated as described above, the control unit 120 determines whether a sensing signal is output from the hall sensor 140. If the sensing signal is not output from the hall sensor 140, it is regarded that the seat caught situation has occurred and may be referred to as the hall sensor error state.

Like this, if the sensing signal is not output from the hall sensor 140, the control unit 120 determines that the seat caught situation has occurred. The seat caught situation can occur not only at the end of the sliding movement section (points a, b) but also at a specific point (point c) in the sliding movement section as shown in FIG. 5. In this case, since the seat motor 130 is continuously operated, the motor signal is output, but the hall sensor 140 is in an error state and no sensing signal is output. For reference, in FIG. 5, A represents a point at which a seat caught situation occurs in the entire moving section of the seat, and B represents a hall sensor error section together with the motor output signal of the seat. The seat caught situation as in A occurs due to both ends and mechanical abnormality in the physical movement section of the seat.

As described above, the control unit 120 monitors the output state of the hall sensor 140 and selects the second operation mode if no sensing signal is generated from the hall sensor 140 in a state where the operation switch 110 is operated (s 104). Then, the control unit 120 operates the seat motor 130 at the maximum current amount (s108). Accordingly, the seat motor 130 moves the seat back and forth due to sufficient operation power while operating at a duty of 100% (s 110). That is, in the case where the seat caught situation occurs, the initial driving current is inevitably short when the current is supplied to the soft start mode, which is the general first operation mode, so that the seat cannot be moved. Herein, the operation mode according to duty 100% will be a power supply that can be provided to the seat motor 130 side of the battery power. For example, since the battery power is supplied to various electric/electronic devices provided in the vehicle while the vehicle is turned on, the remaining power sources other than the power supply are supplied to the starter motor. Of course, this amount of power is larger than the amount of current supplied during the soft start.

On the other hand, when the sensing signal is outputted from the hall sensor 140, the control unit 120 determines that the seat caught situation does not occur. Therefore, the first operation mode is selected as the normal operation mode so that the soft start method is performed (s 106). Therefore, in the initial driving, only the minimum current necessary for the sliding movement is supplied, and then the current is supplied with gradual increases, so that it can be started smoothly.

FIG. 6 is a flow chart illustrating the method of controlling the seat for vehicle according to an exemplary embodiment of the present invention.

The driver (occupant) operates the operation switch 110 to move the position of the seat (s120). The operation switch 110 will be operated for about one second although it differs depending on the driver.

And when the operation switch 110 is operated, the seat must be moved in the soft start mode (s121), and the seat may not move in some cases (Example in s122). That is when the seat caught situation has occurred. In this case, the control unit 120 controls the seat motor 130 to be in a non-driven state in order to prevent the seat from sliding (s124). Also, the control unit 120 stores the information that the seat movement does not occur due to the seat caught situation.

Thereafter, when the operation switch 110 is operated again (s126), the control unit 120 controls the initial operation power to be maximized by applying a 100% duty mode (s 128). The seat can be moved in sliding according to the maximum operation power, and therefore, the seat caught situation is solved.

When the operation switch 110 is next operated based on the non-driven state of the seat occurred during the operation of the operation switch 110, the seat is moved by applying 100% duty mode instead of soft start mode (s130).

And when the operation switch 110 is operated again after the seat is moved according to the 100% duty mode (s 132), the seat is moved according to the soft start mode as in the step 121.

As described above, the present exemplary embodiment is for solving the problem that the seat is not moved in sliding due to insufficient initial current supply when the seat is caught, and when the seat caught situation occurs depending on whether the hall sensor outputs a sensing signal, the seat can be moved by maximizing the operation power of the motor.

While this invention has been described in terms of its characterization, structure, and effects in connection with what is presently considered to be practical exemplary embodiments, it is to be understood that the invention is not limited to the disclosed embodiments. Furthermore, the described characterization, structure, and effects of the embodiments may be modified in various different ways by those skilled in the art. And these differences related to modifications and applications are intended to be included within the scope of the present disclosure as defined in what is claimed.

INDUSTRIAL APPLICABILITY

The present invention is directed to determining the power seat caught situation by using the sensing signal of the hall sensor applied to the seat for vehicle, in the case where a sensing signal is not output, it is determined that a seat caught situation has occurred, and when a sensing signal is output, it is determined that the caught situation does not occur. According to such decision, when a seat caught situation occurs, a seat motor is operated at the maximum current amount to be supplied. Therefore, it is possible to solve the problem that arises in the case of operating in the unconditional soft start mode, that is, the problem that the seat does not move even when the seat caught situation occurs. Of course, if the seat caught situation does not occur, the seat is moved by the soft start method as before, so that the reversal sound and the reverse impact can be reduced. As described above, according to the present invention, one of the two modes can be selectively applied according to the error of the hall sensor, thereby enhancing the product competitiveness. Also, the hall sensor provided in the existing power seat can be used as it is and the present invention can be applied without increasing the cost because the configuration is not required to be added.

What is claimed is:

1. An apparatus for controlling a vehicle seat comprising:
    an operation switch to move the seat;
    a seat motor coupled to the operation switch for providing operation power for a seat sliding; movement for the seat; and
    wherein, during the operation of the operation switch, when the seat does not slide despite power supplied to the seat motor, the seat motor is controlled as a non-operation mode, and when the operation switch operates again, the seat motor is controlled as a maximum operation power mode.

2. The apparatus for controlling seat for vehicle of claim 1,
    wherein the control unit controls the seat to be driven in a soft start mode and makes sliding movement of the seat which is a basic operation mode, when the operation switch is operated again after the seat motor drives in the maximum operation power.

3. An apparatus for controlling seat for vehicle comprising:
    a seat motor providing operation power for seat sliding movement;
    a hall sensor sensing whether the seat slides or not;

a control unit controlling the operation of the seat motor by selecting one operation mode according to the sensing signal out of the sensor;

wherein the operation mode comprising a first operation mode of a soft start mode and a second operation mode driving the seat motor at a maximum current amount.

4. The apparatus for controlling seat for vehicle of claim 3, wherein when the sensing signal is not output, the control unit controls the seat motor in the first operation mode.

5. The apparatus for controlling seat for vehicle of claim 3, wherein, the hall sensor is mounted on a part of the rail on which the seat moves.

6. The apparatus for controlling seat for vehicle of claim 3, wherein when the sensing signal is output, the control unit controls the seat motor in the second operation mode.

7. A method for controlling seat for vehicle comprising; operating an operation switch for seat movement; determining whether a sensing signal is output from a hall sensor connected with a seat motor when the operation of the operation switch is sensed; and controlling the seat motor to different operation modes comprising a soft start mode and a maximum operation power mode according to the sensing signals.

8. The method for controlling seat for vehicle of claim 7, wherein when the sensing signal is not output, controlling the seat motor comprises supplying a current available for the seat motor from the vehicle battery power.

9. The method for controlling seat for vehicle of claim 7, wherein controlling the seat motor comprises supplying the maximum operation power for the seat motor when the operation switch is controlled again when the seat does not slide.

10. The method for controlling seat for vehicle of claim 9, further comprises after the seat movement happens by controlling the seat motor at the maximum operation power, operating the operation switch again; and controlling the seat motor basically at the soft start mode.

* * * * *